(12) United States Patent
Prybell, Jr. et al.

(10) Patent No.: US 11,562,426 B2
(45) Date of Patent: *Jan. 24, 2023

(54) SYSTEM AND METHOD FOR OPTIMIZING ORDER PLACEMENT IN AN ORDER QUEUE IN AN ELECTRONIC TRADING ENVIRONMENT

(71) Applicant: Trading Technologies International, Inc., Chicago, IL (US)

(72) Inventors: Richard A. Prybell, Jr., St. Charles, IL (US); Peter A. Levenberg, Naperville, IL (US)

(73) Assignee: Trading Technologies International, Inc., Chicago, IL (US)

( * ) Notice: Subject to any disclaimer, the term of this patent is extended or adjusted under 35 U.S.C. 154(b) by 441 days.

This patent is subject to a terminal disclaimer.

(21) Appl. No.: 13/972,304

(22) Filed: Aug. 21, 2013

(65) Prior Publication Data

US 2014/0108221 A1 Apr. 17, 2014

Related U.S. Application Data

(63) Continuation of application No. 13/553,985, filed on Jul. 20, 2012, now Pat. No. 8,548,899, which is a
(Continued)

(51) Int. Cl.
*G06Q 40/04* (2012.01)
(52) U.S. Cl.
CPC ................... *G06Q 40/04* (2013.01)
(58) Field of Classification Search
CPC ........ G06Q 40/00; G06Q 40/06; G06Q 40/04; H04N 21/458
(Continued)

(56) References Cited

U.S. PATENT DOCUMENTS

| | | |
|---|---|---|
| 5,793,301 A | 8/1998 | Patterson, Jr. et al. |
| 6,772,132 B1 | 8/2004 | Kemp, II et al. |

(Continued)

FOREIGN PATENT DOCUMENTS

| | | | |
|---|---|---|---|
| WO | WO-0038093 A1 * | 6/2000 | ............ G06Q 30/06 |
| WO | 00/62187 * | 10/2000 | |

(Continued)

OTHER PUBLICATIONS

Harris, The informational content of the limit order book, Journal of Financial Markets Oct. 2004.*

(Continued)

*Primary Examiner* — Richard C Weisberger
(74) *Attorney, Agent, or Firm* — McDonnell Boehnen Hulbert & Berghoff LLP

(57) ABSTRACT

Systems and methods for optimizing order placement in an electronic trading environment are provided. Global queue holder orders are placed in a tradeable object to reserve quantity for traders. Traders may submit order requests for quantity at price levels at which a global queue holder order is holding quantity. When a trader submits an order for a quantity at a price level at which quantity is being held, a gateway compares the order to the global queue holder order information stored in a database. If the trader's order coincides with a price level at which quantity is held, then the gateway virtually transfers ownership of that quantity to the trader, who then assumes the advantageous queue position. When the quantity associated with the order is filled, the fill information is sent to the gateway, which to the database to determine which trader is associated with the filled order quantity.

14 Claims, 10 Drawing Sheets

Related U.S. Application Data continuation of application No. 11/928,458, filed on Oct. 30, 2007, now Pat. No. 8,249,976.

(58) Field of Classification Search
USPC .......................................................... 705/37
See application file for complete search history.

(56) References Cited

U.S. PATENT DOCUMENTS

| | | | |
|---|---|---|---|
| 7,113,924 | B2 | 9/2006 | Fishbain |
| 7,127,424 | B2 | 10/2006 | Kemp, II et al. |
| 7,149,720 | B2 | 12/2006 | Shepherd |
| 7,243,083 | B2 | 7/2007 | Burns et al. |
| 7,389,268 | B1 | 6/2008 | Kemp, II et al. |
| 7,437,325 | B2 | 10/2008 | Kemp, II et al. |
| 7,512,560 | B2 * | 3/2009 | Colle .................. G06Q 40/04 705/37 |
| 7,620,586 | B2 * | 11/2009 | Rosenthal ............ G06Q 40/04 705/37 |
| 7,644,030 | B2 | 1/2010 | Burns et al. |
| 7,672,896 | B2 | 3/2010 | Burns et al. |
| 7,813,995 | B2 | 10/2010 | Burns et al. |
| 7,904,370 | B2 | 3/2011 | Singer et al. |
| 7,904,371 | B2 | 3/2011 | Davidowitz et al. |
| 8,065,221 | B2 | 11/2011 | Burns et al. |
| 8,145,557 | B2 | 3/2012 | Gilbert et al. |
| 8,249,976 | B1 | 8/2012 | Prybell, Jr. et al. |
| 8,311,932 | B2 | 11/2012 | Burns et al. |
| 8,548,899 | B2 | 10/2013 | Prybell et al. |
| 8,712,904 | B2 | 4/2014 | Burns et al. |
| 9,881,338 | B2 * | 1/2018 | Schmitt .................. G06Q 40/06 |
| 2002/0147675 | A1 | 10/2002 | Das et al. |
| 2003/0004852 | A1 | 1/2003 | Burns |
| 2003/0167224 | A1 | 9/2003 | Periwal |
| 2003/0200167 | A1 | 10/2003 | Kemp, II et al. |
| 2003/0236737 | A1 | 12/2003 | Kemp, II et al. |
| 2004/0088242 | A1 * | 5/2004 | Ascher .................. G06Q 40/04 705/37 |
| 2004/0172337 | A1 | 9/2004 | Spoonhower et al. |
| 2004/0193526 | A1 | 9/2004 | Singer et al. |
| 2004/0267655 | A1 | 12/2004 | Davidowitz et al. |
| 2005/0038732 | A1 | 2/2005 | Sweeting et al. |
| 2005/0125327 | A1 | 6/2005 | Fishbain |
| 2005/0154668 | A1 | 7/2005 | Burns et al. |
| 2006/0293996 | A1 * | 12/2006 | Lutnick .................. G06Q 40/04 705/37 |
| 2007/0027796 | A1 * | 2/2007 | Claus et al. .................... 705/37 |
| 2007/0078749 | A1 | 4/2007 | Burns et al. |
| 2007/0078752 | A1 | 4/2007 | Burns et al. |
| 2010/0070403 | A1 | 3/2010 | Burns et al. |
| 2011/0047607 | A1 | 2/2011 | Chen et al. |
| 2012/0036061 | A1 | 2/2012 | Burns et al. |
| 2012/0284171 | A1 | 11/2012 | Prybell et al. |
| 2013/0036041 | A1 | 2/2013 | Burns et al. |
| 2013/0124387 | A1 | 5/2013 | Friesen et al. |
| 2014/0195408 | A1 | 7/2014 | Burns et al. |

FOREIGN PATENT DOCUMENTS

| | | | |
|---|---|---|---|
| WO | 2000/062187 A2 | 10/2000 | |
| WO | WO-2007144261 A1 * | 12/2007 | ............. G06Q 40/04 |

OTHER PUBLICATIONS

Y: Bahadur, Nigel. Futures: News, Analysis & Strategies for Futures, Options & Derivatives Traders. Jun. 2007, vol. 36 Issue 7, p. 58-59. 2p., Database: Business Source Complete.*

Brady, S., "US Exchanges Fight for Market Share," (includes related article on automated trading and order-matching system Globex), (Futures and Options: A Fight to the Finish?), Euromoney, Jul. 1989, 5 pages.

International Search Report and Written Opinion of International Application No. PCT/US2006/038030 dated Jun. 29, 2007 (dated Aug. 29, 2007).

Supplementary European Search Report in EP Application No. 06815774.2 dated Mar. 4, 2011, dated Mar. 11, 2011.

* cited by examiner

Trader at Client Device 502, 504, or 506

SYSTEM AND METHOD FOR OPTIMIZING ORDER PLACEMENT IN AN ORDER QUEUE IN AN ELECTRONIC TRADING ENVIRONMENT

CROSS REFERENCE TO RELATED APPLICATIONS

This application is a continuation of U.S. patent application Ser. No. 13/553,985 filed Jul. 20, 2012, now U.S. Pat. No. 8,548,999, which is a continuation of U.S. patent application Ser. No. 11/928,458 filed Oct. 30, 2007, now U.S. Pat. No. 8,249,976, entitled "System and Method for Optimizing Order Placement in an Order Queue in an Electronic Trading Environment," the contents of which are fully incorporated herein by reference.

FIELD OF INVENTION

The present invention is directed to electronic trading. More specifically, the present invention is directed to optimizing the placement of an order in an order queue in an electronic trading environment.

BACKGROUND

Electronic trading refers to a trading system that matches orders by an electronic trading platform. Current examples of electronic trading platforms include the Chicago Mercantile Exchange ("CME") Globex® trading system, the Chicago Board of Trade ("CBOT") e-cbot, and Eurex, just to name a few. A trading system that matches orders electronically is also referred to herein as an "electronic exchange." Exchanges like the CME and CBOT currently offer trading via open outcry in addition to electronic trading.

With respect to electronic exchanges, traders connect to an electronic trading platform by way of a communication link through their client devices. Once connected, traders select which tradeable objects they wish to trade. As used herein, the term "tradeable object" refers to anything that can be traded with a quantity and/or a price. It includes, but is not limited to, traded events, goods and/or financial products such as stocks, options, bonds, futures, currency, and warrants, as well as funds, derivatives and collections of the foregoing, and all types of commodities, such as grains, energy, and metals. The tradeable object may be "real," such as products that are listed by an electronic exchange, or "synthetic," such as a combination of real products that is created by the user. A tradeable object could actually be a combination of other tradeable objects, such as a class of tradeable objects.

Sometimes, on their machines, traders use automated or semi-automated trading tools, collectively hereinafter referred to as automated tools that automatically or semi-automatically send orders to the electronic exchange. Such trading tools are usually provided, among other things, to facilitate fast and accurate order entry. For instance, an automated tool might quickly calculate one or more order parameters, such as an order price or order quantity, based on market conditions or some other reference condition, and then automatically send an order with these parameters to an electronic exchange for matching.

According to many existing and popular electronic exchanges today, orders are electronically entered in an exchange order book in the sequence in which they are entered into the market (a first-in, first-out, commonly referred to as FIFO matching system). Based on this sequence and the availability of market quantity, orders are filled with priority given to the first order entered, then the second (next) order entered, and so forth. Different variations of FIFO or different matching systems altogether can be used as well.

It is therefore beneficial to provide an automated or semi-automated trading tool that offers an improved method for optimizing the placement of orders in an electronic trading environment.

SUMMARY

The embodiments described herein, provide a system and method for optimizing the placement of an order in an electronic trading environment. To illustrate the present invention and aspects thereof, the following description, including the figures and detailed description, provides examples that can be used or readily modified by one of ordinary skill to generate a system or method that benefits from the teachings described and claimed herein.

In many instances, spotting an opportunity in the market and capitalizing on the opportunity before the market moves or before a competing trader can separate the traders who are successful from the ones who are not. An important component in capitalizing on opportunities involves the trader quickly acting on that information to get the order to the electronic exchange for matching before other traders do to ensure the best placement in the order queue and increased likelihood of getting filled. However, regardless of the type of matching algorithm used by the electronic exchange, traders have no means to control order positions in an order queue at an electronic exchange except to enter orders as quickly and as accurately as possible.

According to the example embodiments, one or more global queue holder orders may be submitted in a tradeable object to hold one or more positions in an order queue. Global queue holder orders may be configured to be placed around a reference price level, at multiple price levels, with constant or varying quantities, and at varying times during the trading day.

When using conventional automated trading tools, traders may only receive as advantageous of a queue position as they are quick to place an order. According to the present embodiments, traders may receive a better queue position when they place orders at prices levels in which global queue holder orders are already holding quantity to be transferred to their ownership. This method allows a trading administrator to reserve quantity for any trader within a trading firm or brokerage house to gain an important advantage over other traders competing in the market. Additionally, the trading administrator or the automated trading tool, can scale the amount of quantity being held at a price level based on the number of interested traders, market activity, trading volume, etc.

Additionally, traders may submit order requests for quantity at price levels at which global queue holder orders are holding quantity. Traders can be made aware of these price levels by indicating them on the trading screen. Indication of where global queue holder orders have been placed is configurable, but may, for example, include a shaded cell, bolded cell, additional column, etc. Regardless of whether or not the trader is aware of what price levels quantity is being held, the gateway will track orders placed by the traders as well as global queue holder orders. When a trader submits an order for a quantity at a price level at which quantity is being held, the gateway will compare that order information to the global queue holder order information being stored in a database. If the trader's order coincides with a price level at which quantity is held, then the gateway will virtually transfer ownership of that quantity to the trader. If/when that order quantity is matched at the electronic exchange, the fill information will be sent back to the gateway, at which time the gateway then looks to the database to see which trader actually took possession of the order quantity. The associated fill information will be forwarded to that trader.

Other examples are provided herein. Modifications may also be made to the system and methods without departing from the spirit or scope of the invention. Additional features and advantages of the embodiments will be set forth in the description that follows. The features and advantages of the example embodiment may be realized and obtained through the embodiments particularly pointed out in the appended claims. These and other features will become more fully apparent from the following description, figures, and appended claims, or may be learned by the practice of the example embodiments as set forth hereinafter.

BRIEF DESCRIPTION OF THE DRAWINGS

Example embodiments are described herein with reference to the following drawings, in which.

DETAILED DESCRIPTION

The present invention is related to optimizing the position of an order in an order queue in an electronic trading environment. To illustrate aspects of the present invention, a system and method are illustrated in example form using the drawings referred to herein. One of ordinary skill in the art will recognize, however, that such examples may be quickly and readily adaptable using the teachings described herein. Aspects of the present invention are protected by the accompanying claims. Limitations from the patent specification should not be improperly incorporated into the claims unless explicitly stated or otherwise inherently known.

I. A First Example Trading System

Figure 1:
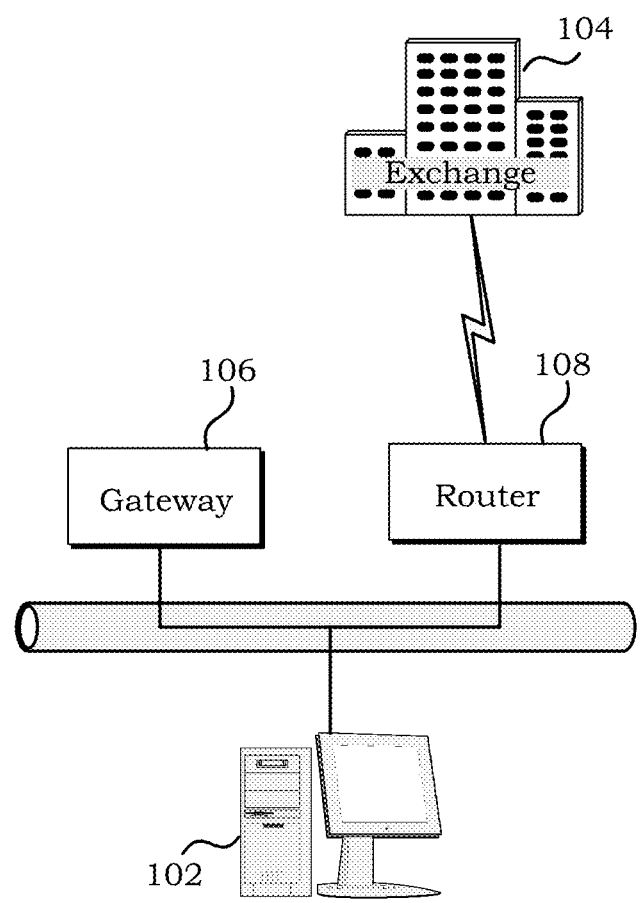
FIG. 1 illustrates an example electronic trading system for trading, wherein the trading system includes a trading station where a trader can submit bids and offers for a tradeable object being traded at an electronic exchange.

FIG. 1 illustrates an example electronic trading system in which the example embodiments may be employed. In this example, the trading system comprises a client device 102 that accesses an electronic exchange 104 through a gateway 106. Router 108 is used to route messages between the gateway 106 and the electronic exchange 104. The electronic exchange 104 includes a computer process (e.g., the central computer) that matches buy and sell orders sent from the client device 102 with orders from other client devices (not shown). The electronic exchange 104 may list one or more tradeable objects for trading. While not shown in FIG. 1 for the sake of clarity, the trading system may include other devices that are specific to the client site like middleware and security measures like firewalls, hubs, security managers, and so on, as understood by a person skilled in the art.

Regardless of the types of order execution algorithms used, the electronic exchange 104 provides market information to the subscribing client device 102. Market information may include data that represents just the inside market. The inside market is the lowest sell price (best ask) and the highest buy price (best bid) at a particular point in time. Market information may also include market depth. Market depth refers to quantities available at the inside market and can also refer to quantities available at other prices away from the inside market. The quantity available at a given price level is usually, although not necessarily, provided by the host exchange in aggregate sums. In other words, an electronic exchange usually provides the total buy quantity and the total sell quantity available in the market at a particular price level in its data feed. The extent of the market depth available to a trader usually depends on the electronic exchange. For instance, some electronic exchanges provide market depth for all (or most) price levels, while some provide only quantities associated with the inside market, and others may provide no market depth at all. Additionally, the electronic exchange 104 can offer other types of market information such as the last traded price (LTP), the last traded quantity (LTQ), and order fill information.

The computer employed as the client device 102 generally can range from a hand-held device, laptop, or personal computer to a larger computer such as a workstation with multiple multiprocessors. Generally, the client device 102 includes a monitor (or any other output device) and an input device, such as a keyboard, a trackball, and/or a two or three-button mouse to support click based trading, if so desired. One skilled in the art of computer systems will understand that the present example embodiments are not limited to any particular class or model of computer employed for the client device 102 and will be able to select an appropriate system.

The computer employed as the gateway 106 generally can range from a personal computer to a larger or faster computer. Generally, the gateway 106 may additionally include a monitor (or any other output device), input device, and access to a database, if so desired. One skilled in the art of computer systems will also understand that the present example embodiments are not limited to any particular class or model of computer(s) employed for the gateway 106 and will be able to select an appropriate system.

It should be noted that a computer system that may be employed here as a client device or a gateway generally includes a central processing unit, a memory (a primary and/or secondary memory unit), an input interface for receiving data from a communications network, an input interface for receiving input signals from one or more input devices (for example, a keyboard, mouse, etc.), and an output interface for communications with an output device (for example, a monitor). A system bus or an equivalent system may provide communications between these various elements.

In general, it should be understood that the devices described herein could include hardware objects developed using integrated circuit development technologies, or yet via some other methods, or the combination of hardware and software objects that could be ordered, parameterized, and connected in a software environment to implement different functions described herein. Also, the hardware objects could communicate using electrical signals, with states of the signals representing different data.

It should also be noted that the client device 102 generally executes application programs resident at the client device 102 under the control of the operating system of the client device 102. Also, the gateway 106 executes application programs resident at the gateway 106 under the control of the operating system of the gateway 106. In other embodiments and as understood by a person skilled in the art, the function of the application programs at the client device 102 may be performed by the gateway 106, and likewise, the function of the application programs at the gateway 106 may be performed by the client device 102.

The actual electronic trading system configurations are numerous, and a person skilled in the art of electronic trading systems would be able to construct a suitable network configuration. For the purposes of illustration, some example configurations are provided to illustrate where the elements may be physically located and how they might be connected to form an electronic trading system. These illustrations are meant to be helpful to the reader, and they are not meant to be limiting. According to one example illustration, the gateway device may be located at the client site along with the trading station, which is usually remote from the matching process at the electronic exchange. According to this instance, the trading station, the gateway, and the router may communicate over a local area network, and the router may communicate with the matching process at the electronic exchange over a T1, T3, ISDN, or some other high speed connection.

In another example illustration, the client site may be located on the actual grounds of the electronic exchange (for example, in the building of the exchange). According to this instance, the trading station, the gateway, and the router may still communicate over a local area network, but the router may communicate with the matching process at the electronic exchange through another connection means besides a T1, T3, or ISDN. In yet another example illustration, the gateway may be housed at, or near, its corresponding electronic exchange. According to this instance, the client device may communicate with the gateway over a wide area network or through the use of a T1, T3, ISDN, or some other high speed connection.

Further, the gateway may be located remote from the client device and remote from the electronic exchange, which might be particularly useful in systems that include interconnection of multiple trading networks. Thus, one trading network might have gateway access to an electronic exchange. Then, other trading networks may communicate with the trading network that has gateway access through a T1, T3, ISDN, or some other high speed connection.

II. A Second Example Trading System

Figure 2:
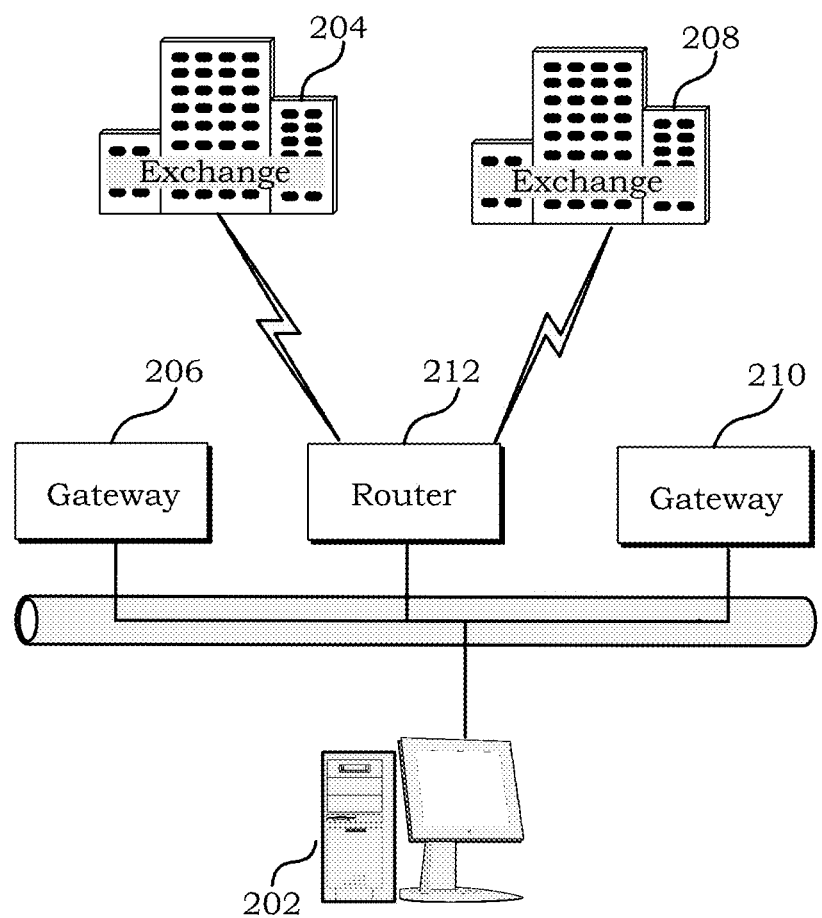
FIG. 2 illustrates another example electronic trading system for electronic trading, wherein this trading system includes a trading station where a trader can submit bids and offers for a tradeable object being traded at more than one electronic exchange.

FIG. 2 illustrates another example electronic trading system that uses similar computer elements as shown in FIG. 1, in which a trader may access and trade at multiple electronic exchanges. The system comprises a client device 202 that can access multiple electronic exchanges 204 and 208. In this particular embodiment, electronic exchange 204 is accessed through gateway 206 and electronic exchange 208 is accessed through another gateway 210. Alternatively, a single gateway may be programmed to handle more than one electronic exchange. Router 212 is used to route messages between the gateways 206 and 210 and the electronic exchanges 204 and 208. While not shown in the figure, the system may include other devices that are specific to the client site like middleware and security measures like firewalls, hubs, security managers, and so on, as understood by a person skilled in the art. Additional electronic exchanges may be added to the system so that the trader can trade at any number of exchanges, if so desired.

The trading system presented in FIG. 2 provides the trader with the opportunity to trade tradeable objects listed at different electronic exchanges. To some traders, there can be many advantages with a multi-exchange environment. For example, a trader could view market information from each tradeable object through one common visual display. As such, price and quantity information from the two separate electronic exchanges may be presented together so that the trader can view both markets simultaneously in the same window. In another example, a trader can spread trade different tradeable objects listed at the different electronic exchanges.

As indicated earlier, one skilled in the art of electronic trading systems will understand that the present embodiments are not limited to the particular configurations illustrated and described with respect to FIG. 1 and FIG. 2, and will be able to design a particular system based on the specific requirements (for example, by adding additional exchanges, gateways, client devices, routers, or other computers serving various functions like message handling and security). Additionally, several networks, like either of the networks shown in FIG. 1 or FIG. 2, may be linked together to communicatively access one or more electronic exchanges.

III. Client Device

Client devices 102 and 202 can be computers, such as a workstation, desktop, laptop, handheld device, and so forth, that allow a trader to trade one or more tradeable objects that are offered at exchange(s). A client device may include at least processor and memory. Preferably, the processor has enough processing power to handle and process various types of market information. The more market information is received and processed, the more processing power is preferred. However, any present day processor has enough capability to perform at least the most basic part of the present invention.

Memory may include a computer readable medium. The term computer readable medium, as used herein, refers to any medium that participates in providing instructions to a processor unit for execution. Such a medium may take many forms, including but not limited to, non-volatile media, and transmission media. Non-volatile media include, for example, optical or magnetic disks, such as storage devices. Volatile media include, for example, dynamic memory, such as main memory or random access memory ("RAM"). Common forms of computer readable media include, for example, floppy disks, flexible disks, hard disks, magnetic tape, punch cards, CD-ROM, a RAM, a PROM, an EPROM, a FLASH-EPROM, and any other memory chip or cartridge, or any other medium from which a computer can read.

When a client device receives market information or other data, such as news, or charting data, and order related information from an electronic exchange, the received information may be displayed to the trader(s) on the visual output device or display device. However, it should be understood that the information could be provided to a trader using other means such as sound. The output device can be any display device. For example, the display could be a CRT-based video display, an LCD-based or a gas plasma-based flat-panel display, a display that shows three-dimensional images, or some other type of display.

Upon viewing the market information or a portion thereof, a trader may wish to send orders to an electronic exchange, cancel orders, change orders, query an electronic exchange, and so on. To do so, the trader may input various commands or signals into a client device such as by typing into a keyboard, inputting commands through a mouse, or inputting commands or signals through some other input device. For instance, a trader may click a mouse button to initiate an order to buy a particular quantity of the tradeable object at a particular price. Then, a client device preferably generates transaction information. There are many different types of messages and/or order types that can be submitted, all of which may be considered various types of transaction information. Once generated, transaction information is sent from a client device to one or more host exchanges over communication links.

In one example embodiment, a client device uses software to create specialized interactive trading screens on terminals associated with them. Trading screens preferably enable traders to, among other things, enter and execute orders, obtain market quotes, and monitor positions. The range and quality of features available to the trader on his or her trading screen may vary according to the specific software application being run. In addition to or in place of the interactive trading screens, a client device could run automated types of trading applications.

IV. An Example Trading Station

Figure 3:
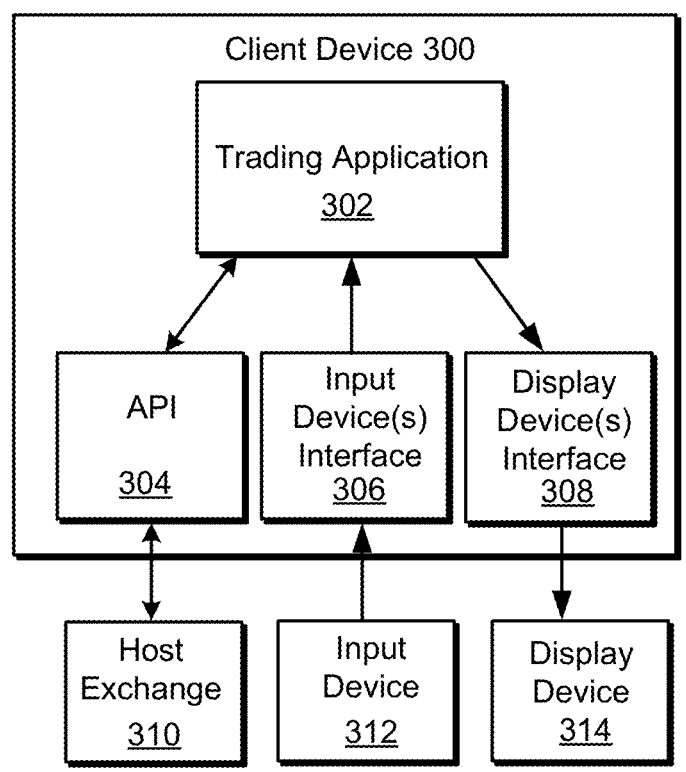
FIG. 3 illustrates an example trading station of either FIG. 1 or FIG. 2 where a user can submit bids and offers for a tradeable object being traded at one or more electronic exchanges.

FIG. 3 illustrates an example trading station 300 which is similar to the type of trading stations 102 and 202 shown in FIGS. 1 and 2. Trading station 300 can be any particular type of computing device, examples of which were enumerated above. According to one example embodiment, trading station 300 has a trading application 302 stored in memory that when executed arranges and displays market information in many particular ways, usually depending on how the trader prefers to view the information. Trading application 302 may also implement an automated trading tool such as the automated spread trading tool that automatically sends orders into underlying legs to achieve a spread.

Preferably, trading application 302 has access to market information from one or more electronic exchanges 310 through API 304 (or application programming interface), and trading application 302 can also forward transaction information to electronic exchange 310 via API 304. Alternatively, API 304 could be distributed so that a portion of the API rests on the trading station 300 and a gateway, or at the electronic exchange 310. Additionally, trading application 302 may receive signals from input device 312 via input device interface 306 and can be given the ability to send signals to display device 314 via display device interface 308.

Alternatively, the example embodiments described herein may be a separate program from trading application 302, but still stored in memory and executed on the trading station 300. In another alternative embodiment, the preferred embodiments may be a program stored in memory and executed on a device other than trading station 300. Example devices may include a gateway or some other well known intermediary device.

V. Global Queue Holder Overview

Figure 4:
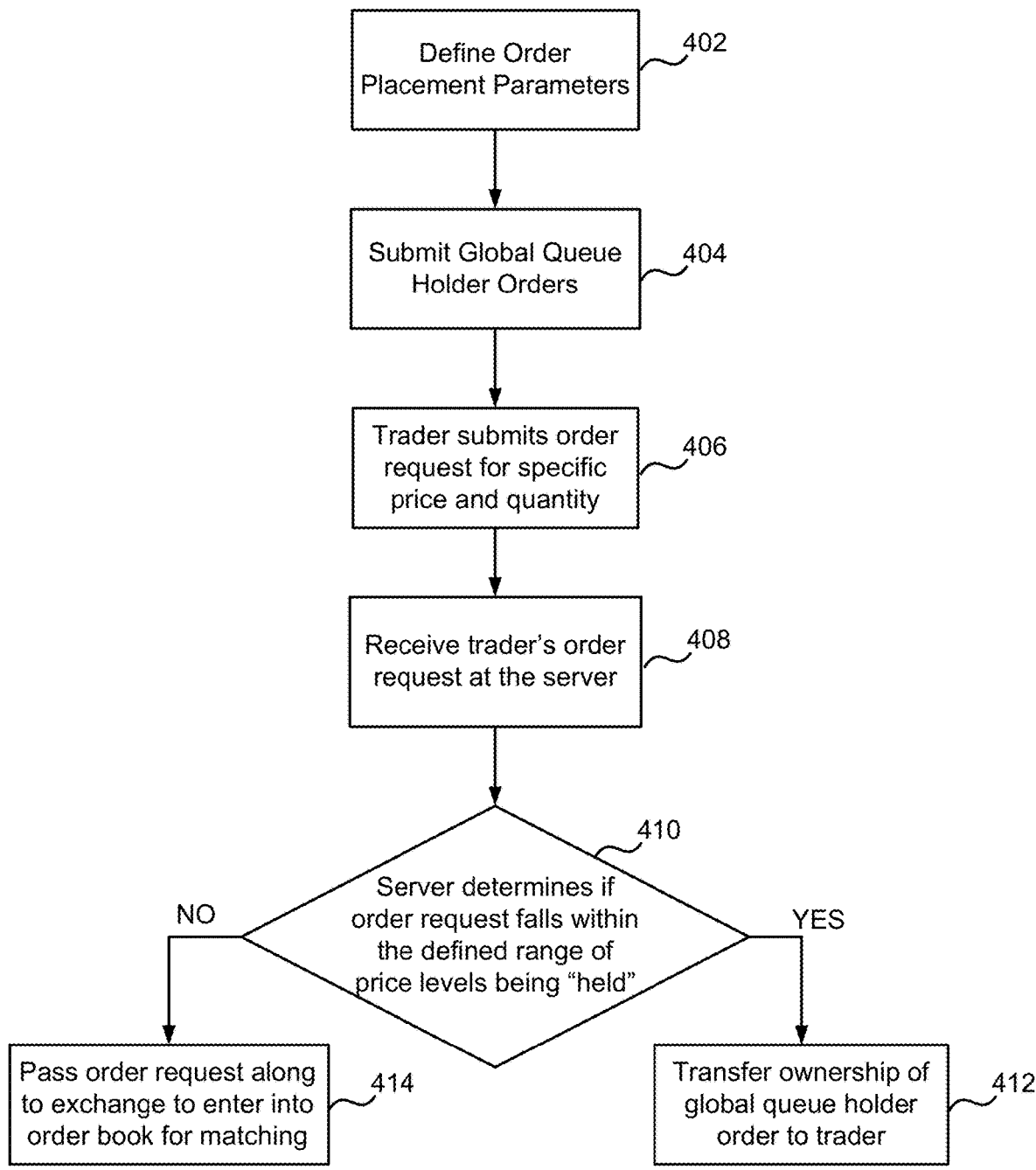
FIG. 4 is a flow chart illustrating an example method for optimizing order placement in an electronic trading environment.

FIG. 4 is a flow chart illustrating an example method for optimizing the position of an order in an order queue in an electronic trading environment. It should be understood that the flow chart only shows the functionality and operation of a possible implementation of the example method. In this regard, each block may represent a module, a segment, or a portion of the program code, which includes one or more executable instructions for implementing specific logical functions or steps in the process. Alternative implementations are included within the scope of the example embodiments of the present invention in which functions may be executed out of order from that shown or discussed, including substantially concurrent or in reverse order, depending on the functionality involved, as would be understood by those reasonably skilled in the art of the present invention.

At step 402 order placement parameters are defined to be associated with one or more global queue holder orders. Specifically, a reference price level is defined and used to place the global queue holder orders. Commonly, the global queue holder orders are limit orders centered around one or two price levels outside of the inside market. It should be understood, however, that any price level could be used as a reference price level. For example, the global queue holder orders could be centered around the last traded price or the inside market. As such, one of ordinary skill in the art will understand that other price levels could also be used as a reference price level and that other order types besides limit orders may be used.

Global queue holder orders placed at or near the inside market carry increased risk of getting filled before ownership is actually transferred to an actual trader. Global queue holder orders placed outside of the inside market can also get filled before ownership is actually transferred. According to the example embodiments, when a global queue holder order is filled before ownership is transferred, the gateway may immediately submit an offsetting order, such as a market order, to flatten the position. One of ordinary skill in the art will understand that there are other alternatives to submitting offsetting orders when non-trader owned global queue holder orders are filled before ownership is transferred.

Additionally, the number of price levels at which to place global queue holder orders around the reference price level is defined as an order placement parameter. Depending on the amount of traders participating in the global queue holder market, how much overall volume is currently being traded, or how quickly the market is moving, any number of orders may be placed on each side of the reference price level. It should be understood that a defined quantity of, for example "2" global queue holder orders, typically correlates to "2" global queue holder orders being placed on each side of the reference price level, for a total of "4" global queue holder orders in that specific tradeable object. Alternatively, the automated trading tool can be configured to only place global queue holder orders on one side of the reference price level instead of both sides of the reference price level, or possibly some other asymmetrical configuration. This may be useful when the market is moving more quickly in one direction than the other.

In another embodiment, whether or not multiple global queue holder orders are placed at the same price level can be defined. For example, instead of placing just "1" global queue holder order at a specific price level, multiple global queue holder orders may be placed at the same price level. It should be understood that each of the multiple global queue holder orders could be for the same quantity or possibly different quantities. For example, if the participating traders generally trade different quantities, then the global queue holder quantities could mimic the quantities typically placed by those traders. This method allows multiple traders to each place orders at the same price level in the tradeable object of varying quantities while gaining advantageous queue positions over the general trading community.

In yet another embodiment, the quantity associated with each of the global queue holder orders is defined. Based on how quickly the market is moving, the amount of volume being traded, etc. each global queue holder order quantity can be configured to be constant, variable, dynamic, or a combination of the three. Specifically, when the quantity is defined to be constant each global queue holder order would be associated with the same quantity, for example "15".

Alternatively, when the quantity is defined to be variable, the automated trading tool may scale the quantity of the global queue holder order based on the proximity to the reference price level, activity in the market, etc. For example, if there are "3" global queue holder orders placed on each side of the reference price level, it may be defined that the global queue holder order closest to the reference price level hold a quantity of "10," the middle global queue holder order hold a quantity of "7", and the furthest order hold a quantity of "5". It should be understood that any quantity could be defined.

Alternatively, the automated trading tool may analyze the market of the specific tradeable object and determine how much quantity the traders are currently trading. Based on the determination, the automated trading tool dynamically enters global queue holder orders with quantity similar to what is currently being traded at the trading firm in the tradeable object. If market activity increases or decreases, the automated trading tool may also place or remove global queue holder orders to mimic the activity of traders at the trading group or the activity of the market itself.

Additionally, the automated trading tool could use historical trading information to determine the global queue holder order quantities throughout the trading day. Based on one or more previous day's trading activity, average order quantities, trading patterns, etc. the automated trading tool may increase or decrease the global queue holder quantity. A combination of the different quantities, constant, variable, and dynamic, allow the system to be flexible by initially place orders with constant or variable quantities and then change to dynamic quantities.

In another embodiment, the time at which the automated trading tool places and replaces global queue holder orders in a specific tradeable object is defined. For example, it can be defined that global queue holder orders are sent at the start of the trading day. As traders enter order requests and the gateway associates ownership of a specific queue holder order with a specific trader, another queue holder order for the same initial quantity or quantity equal to that requested by a trader, may be placed at the same price level. Alternatively, the automated trading tool may monitor the market in the tradeable object, and based on the volatility or trading volumes, place or remove global queue holder orders from the market.

At step 404, based on the configured order placement parameters, the automated trading tool submits global queue holder orders in the specified tradeable object(s). As previously described, global queue holder orders may be placed in the market at the start of the trading day and as needed throughout the trading day to ensure that advantageous queue positions being held for participating traders. The global queue holder orders will be placed at the defined prices levels for the defined amount of quantity, which as previously stated may be constant or variable. It should also be understood that the global queue holder orders are initially associated with a default trader and are not "owned" by a specific trader. The global queue holder orders are considered a place holder with a better position in the order queue for actual orders received from actual traders desiring to buy or sell quantity of the tradeable object in the future.

At step 406, subsequent to the placement of the global queue holder orders, a trader, who is part of a group of traders that has access to the group of global queue holder orders, submits an order request for a desired price and quantity of the tradeable object. At this point the trader might be aware of the global queue holder orders (e.g. by indication), or might not know of them (e.g. no indication). A trader may elect to participate in using global queue holder orders to obtain more advantageous positions in the order queue. If a trader elects not to participate in using global queue holder orders, their order requests would be submitted to the exchange and entered in the order queue without being associated with a global queue holder order.

At step 408, the gateway or intermediary device, receives the actual order request submitted by the trader for a desired price level and quantity.

At step 410, the gateway analyzes the order request to determine whether or not the order request is associated with a price level at which quantity is currently being held by a global queue holder order.

At step 412, the gateway determines that the trader's order request is associated with a price level at which quantity is being held by a global queue holder order. The gateway transfers ownership, or control of the global queue holder order, to the trader placing the order request. Further, if the trader has elected to participate using global queue holder orders, once the order information is updated in the database and ownership is transferred, the actual order request placed by the trader is dropped by the gateway. The order request is dropped because passing it onto the electronic exchange would enter an additional order at the end of the order queue and the trader would then be responsible for "2" separate orders instead of just "1". As previously mentioned, if a trader has elected not to participate, then their order would not be dropped by the gateway, but instead would be passed onto the electronic exchange and entered at the end of the order queue.

Transferring ownership of the order is accomplished in a virtual manner such that the gateway associates the held quantity with the trader submitting the order request. The information associated with the order request, such as time entered, price, quantity, trader name, tradeable object, etc. may be stored in a storage mechanism, referred to hereinafter as a database, at the gateway. When the aforementioned held quantity is filled, the electronic exchange will send the fill information to the gateway and the gateway will look up the order information in the database. Once the pertinent order information is found in the database, the gateway will send the fill data associated with the order to the actual trader that submitted the corresponding order request.

In the situation where the trader enters an order for a quantity greater than that being held by a global queue holder order, the portion of the quantity that is not covered by the global queue holder order will be placed at the end of the order queue. For example, if a quantity of "10" was being held by a global queue holder order but the trader entered an order request for a quantity of "12", then an order for the remaining quantity of "2" would be placed at the exchange.

In the situation where the trader enters an order for a quantity less than that being held by a global queue holder order, the unaccounted for portion of the global queue holder order will be available for another trader. For example, if a quantity of "12" was being held by a global queue holder order and the trader entered an order request for a quantity of "10", then the remaining quantity of "2" can be made available for another trader to take ownership.

In an alternative embodiment, if there were multiple global queue holder orders, then the remaining quantity could be associated with a different queue holder order. For example, if there were two global queue holder orders in the queue, each for a quantity of "5", and a trader entered an order for a quantity of "10", then the trading system can transfer ownership of the first two global queue holder orders to the trader.

In yet another alternative embodiment, the trading system could analyze the order request placed by the trader and dynamically alter the requested quantity depending on the quantity being held by global queue holder orders at that time. For example, if there is currently a quantity of "7" being held by a global queue holder order and a trader requested a quantity of "5", upon approval by the trader, the automated trading tool or gateway may alter the trader's requested quantity of "5" to a quantity of "7" to mimic the quantity being held by a global queue holder order. Similarly, if the quantity associated with the global queue holder order was less than the quantity requested by the trader, the automated trading tool could dynamically decrease the trader's requested quantity. Both dynamically increasing and decreasing of the trader's requested order quantity to use a global queue holder order would increase chances of traders obtaining the best position in queue.

In another embodiment, if a trader has gained ownership of a global queue holder order and desires to cancel the order, the gateway simply transfers ownership of the global queue holder order back to the "default trader". Once ownership is transferred, that specific global queue holder order may be associated with the "default trader" and can at any time be transferred to another trader. It is also possible that when a trader returns/cancels the order, that the global queue holder order is no longer in the range of prices defined by the order placement parameters. In this instance, the order would then be deleted from the exchange and would not be available for another participating trader to obtain.

In the instance that two traders enter order requests for the same price level, the trader that enters the order request first will gain ownership of the best queue position quantity held by a global queue holder order. Just as is the case with current electronic trading systems, speed is of the utmost importance and in this instance, whichever trader acts or reacts the quickest, will gain the most advantageous queue position for that price level.

At step 414, the gateway determines that the received order request does not pertain to quantity currently being held in the order queue by a global queue holder order. The gateway passes the order request onto the electronic exchange to be entered at the end of the order queue for that price level.

VI. Global Queue Holder Example

Figure 5A:
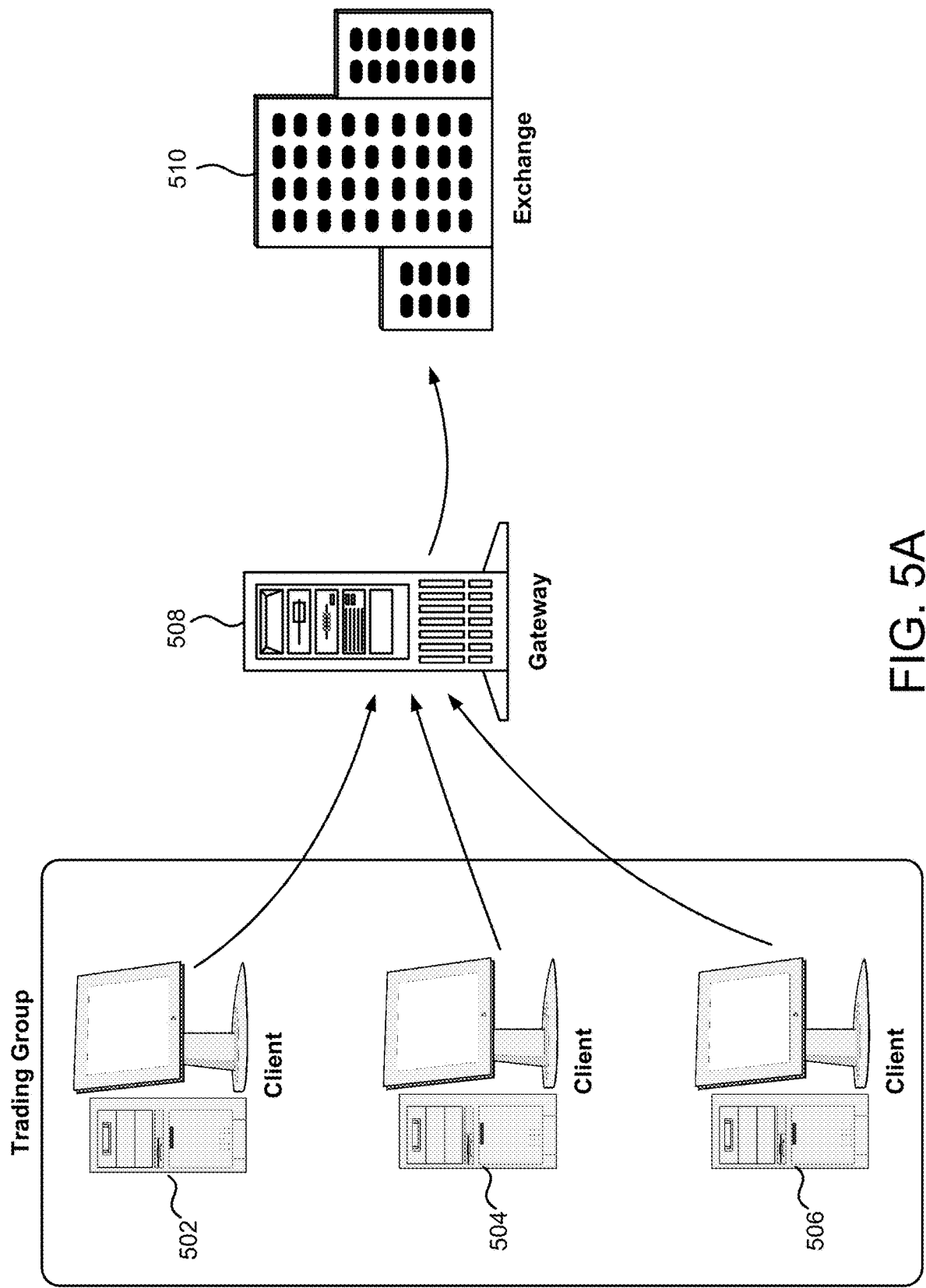
FIG. 5A is a block diagram illustrating an example method for multiple client devices to connect to an electronic exchange.

FIG. 5A is a block diagram illustrating an example method for multiple client devices to connect to an electronic exchange according to the example embodiments. FIG. 5A includes client devices 502, 504, 506, gateway 508, and electronic exchange 510. Client devices 502, 504, 506, are at the same location, for example a trading firm or brokerage house. Each client can trade the same or different products. However, in the following examples the traders at client devices 502, 504, and 506 are trading the same tradeable object, specifically Market A. Each client device connects to the electronic exchange 510, via gateway 508. In this example, gateway 508 manages the global queue holder orders sent from the trading group as well as individual order requests placed by traders at client devices 502, 504, and 506, to obtain quantity being held by a global queue holder order.

Figure 5B:
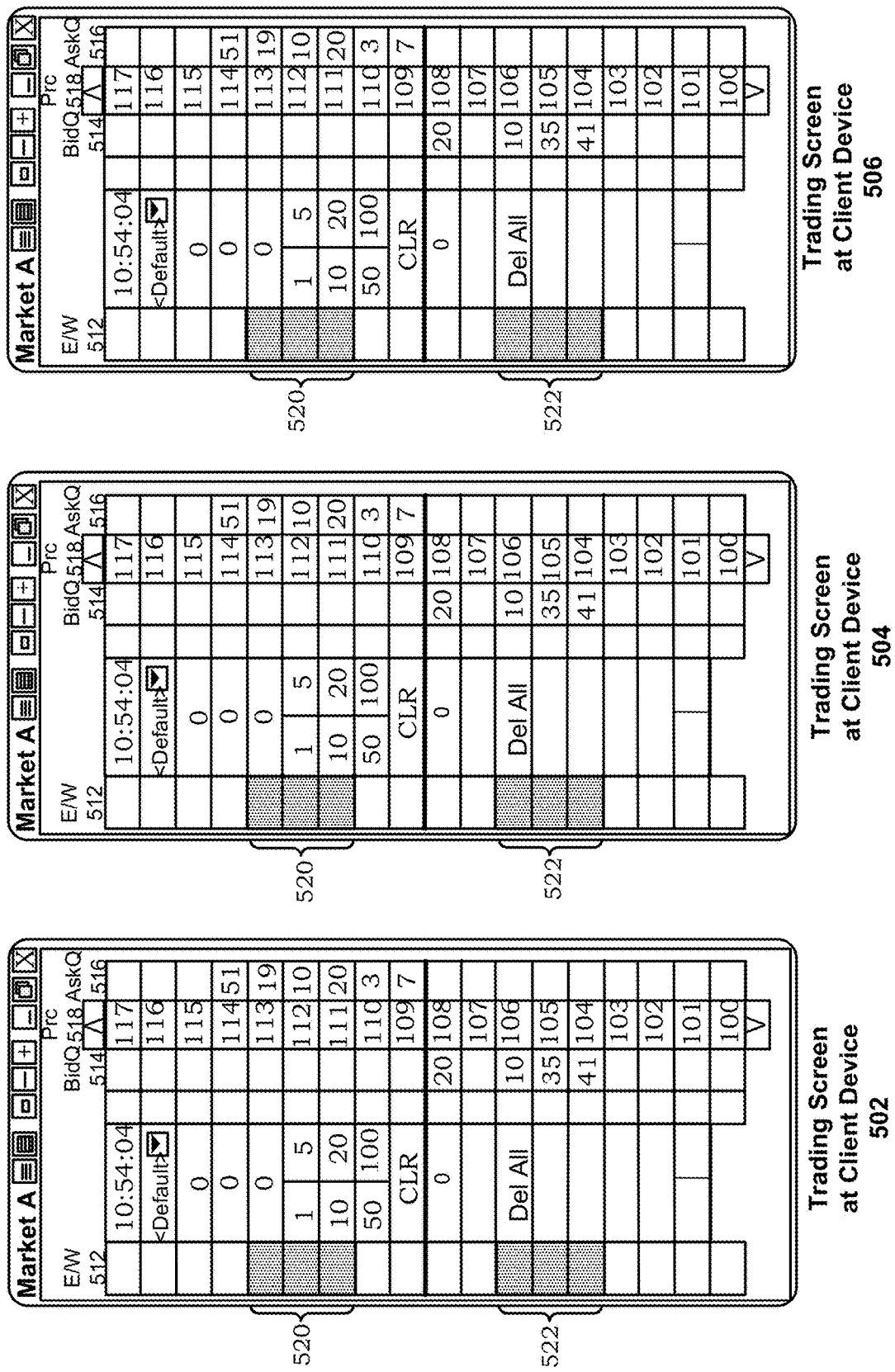
FIG. 5B is a block diagram illustrating an example view of the tradeable object after global queue holder orders have been submitted to the electronic exchange.

FIG. 5B is a block diagram illustrating an example view of the tradeable object after global queue holder orders have been submitted to the electronic exchange. Specifically, FIG. 5B displays three trading screens; the trading screen viewed by the trader at client device 502, the trading screen viewed by the trader at client device 504, and the trading screen viewed by the trader at client device 506. Each trading screen displays a working quantity column 512, bid quantity column 514, ask quantity column 516, price column 518, the global queue holder sell orders 520, and the global queue holder buy orders 522. The working quantity column 512 displays desired orders placed by the trader to buy or sell quantity of that tradeable object. The bid quantity column 514 displays buy order quantities available in the market in relation to certain price levels in price column 518. The ask quantity column 516 displays offer order quantities available in the market in relation to certain price levels in price column 518. The price column 518 displays the price levels associated with the tradeable object. The global queue holder sell and buy orders, 520 and 522 respectively, display orders that have been entered by the automated trading tool based on the trading administrator's defined order placement parameters. It should be understood that the global queue holder orders could be displayed by use of any indication, or possibly no indication. For example, instead of the cells in working quantity column 512 being shaded, cells in the bid or ask quantity could be shaded, or perhaps an additional column could be added to the trading screen. One of ordinary skill in the art will understand the any type of indication may be used.

As previously explained, the order placement parameters are defined prior to global queue holder orders being submitted to the electronic exchange. Let us assume that the reference price level has been defined as "2" price levels outside the inside market or price levels "106" and "111" as shown in FIG. 5B. Additionally, it was defined to place "1" global queue holder order with a quantity of "10" at each of the "3" price levels starting "2" price levels from the, inside market or reference price level.

The gateway recognizes the global queue holder orders and the market information associated with the submitted orders is stored in the database at the gateway or accessible by the gateway, prior to being passed to the electronic exchange. The global queue holder sell orders 520, correspond to price levels "111", "112", and "113." Similarly, the global queue holder buy orders 522, correspond to price levels "104", "105", and "106."

Figure 5C:
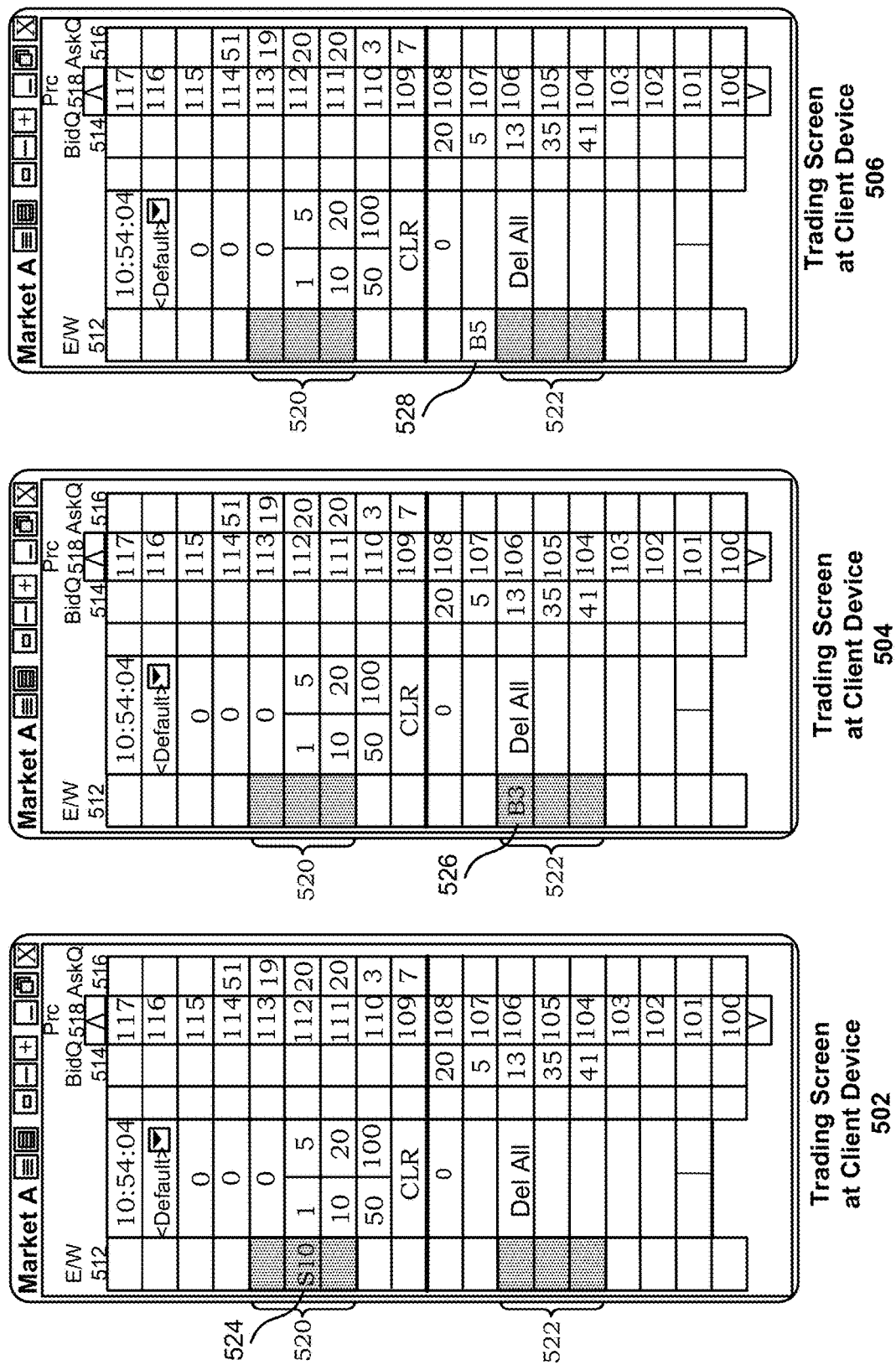
FIG. 5C is a block diagram illustrating an example method for a trader to submit orders to an electronic exchange while using the benefit of global queue holder orders.

FIG. 5C is a block diagram illustrating an example method for a trader to submit orders to an electronic exchange while using the benefit of global queue holder orders. Specifically, FIG. 5C displays the same three trading screens as shown in FIG. 5B; the trading screen for the trader at client device 502, the trading screen for the trader at client device 504, and the trading screen for the trader at client device 506.

As shown in FIG. 5C, the trader at client device 502, submits an order request to sell a quantity of "10" at a price level of "112." This order request is sent from client device 502 to gateway 508, shown in FIG. 5A. Gateway 508 recognizes that an order request has been received and determines that the order request is associated with a price level at which quantity is being held by a global queue holder order. Gateway 508 stores the order information sent from the trader at client device 502 in a database which tracks orders that have been placed by traders and global queue holder orders. The electronic exchange continues to recognize the global queue holder orders as being owned by a "default trader," however, the gateway associates the actual ownership of the order quantity with the trader that submitted the order request. Once gateway 508 has updated the database with the order ownership information, the order request sent by the trader at client device 502 is dropped. The trader's order request is displayed as working order 524 in the working order column 512. When working order 524 fills, the electronic exchange will pass the fill information onto gateway 508. Gateway 508 will look up the corresponding order information in the database to determine which trader is the actual owner of the quantity that was filled. The fill information is then passed on to the trader at client device 502.

According to the example embodiments, a new global queue holder order will be submitted to electronic exchange 508 at a price level of "112" to replace the quantity transferred to the trader at client device 502. It is possible that not only one trader is interested in submitting an order to sell quantity at "112," and is therefore important to hold additional quantity at the price level. As shown in FIG. 5C, the available quantity at price level "112" is "20", "10" of which is trader owned and "10" of which is non-trader owned.

Referring again to FIG. 5C, the trader at client device 504, submits an order request to buy a quantity of "3" at a price level of "106", working order 526. This order request is sent from client device 504 to gateway 508, shown in FIG. 5A. Gateway 508 recognizes that an order request has been received and determines that the order request is associated with a price level at which quantity is being held by a global queue holder order. The gateway stores the information associated with working order 526 as well as the ownership information in a database to be used for further tracking once the actual order is filled, deleted, changed, etc. Gateway 508 virtually transfers ownership from "default trader" to the trader at client device 504 and then deletes the order request sent by the trader at client device 504.

In this instance, there is remaining global queue holder quantity at the price level "106" for other traders to obtain, as the trader at client device 504 only requested "3" of the "10" quantity being held at that price level. As with the order submitted by the trader at client device 502, an additional queue holder order may be submitted to the electronic exchange to replenish the quantity that is now trader owned. Specifically, the automated trading tool may submit a global queue holder order for a quantity of "3", thus making the available global queue holder quantity at price level "106" "10". However, it should be understood that an additional queue holder order may not be sent.

Additionally, the trader at client device 506, submits an order request to buy quantity of "5" at a price level of "107", working order 528. Gateway 508 recognizes that an order request has been received and determines that the order request is not associated with a price level at which quantity is being held by a global queue holder order. The global queue holder orders were placed at price levels "104," "105," and "106," not at price level of "107." In this instance, gateway 508 does not store the information associated with working order 528 or any ownership information in a database. Instead, gateway 508 passes the order request onto the electronic exchange 510 to enter in the order queue at price level "107."

It should be understood that while each trader at a participating trading group may be aware that global queue holder orders have been placed, each individual trader can only see and manage their own working orders, not the working orders of other traders. Thus, the trader at client device 502 will not see the orders entered by the trader at client device 504 or 506, and vice versa.

Using the previous embodiments, there may be more than one trader from the group of traders waiting for fill quantity at a specific price level. In an alternative embodiment, the fill quantity can be distributed to each of the traders participating in global queue holders at the specific price level. For example, there could be "1" global queue holder order at a price level and the fill quantity may be distributed or shared amongst the multiple traders in the order queue at that price level. Specifically, if multiple traders from the group of traders are holding quantity at a specific price level, that quantity may be shared between all the traders instead of just the trader with the best queue position.

In one embodiment of distributing fill quantity, the quantity may be distributed by time priority. In this embodiment all orders are filled based on the first in first out (FIFO) matching algorithm. Quantity is not shared, but is matched on a first come first come basis.

In an additional embodiment of distributing fill quantity, the quantity may be distributed equally amongst the traders in the queue. For example, let's assume there is a quantity of "100" held at a price level, with "10" traders in the queue for that held quantity. If a quantity of "10" fills, then each of the "10" traders will get "1" of their desired quantity filled.

In another additional embodiment of distributing fill quantity, the quantity may be distributed by a weighted distribution. In this embodiment, let's assume that there is a quantity of "100" held at a price level, where the "100" quantity is made up of one "50" lot and five "10" lots. If a quantity of "50" fills, then "25" would go to the "50" lot trader, and a quantity of "5" would go to each of the "10" lot traders.

In yet another embodiment of distributing fill quantity, the quantity may be distributed by trader priority, where each trader is given a priority ranking. When the quantity is distributed by trader priority, regardless of time priority or position in the order queue, the trader with the highest priority ranking will receive fills before the other traders in the order queue at that price level.

Figure 6:
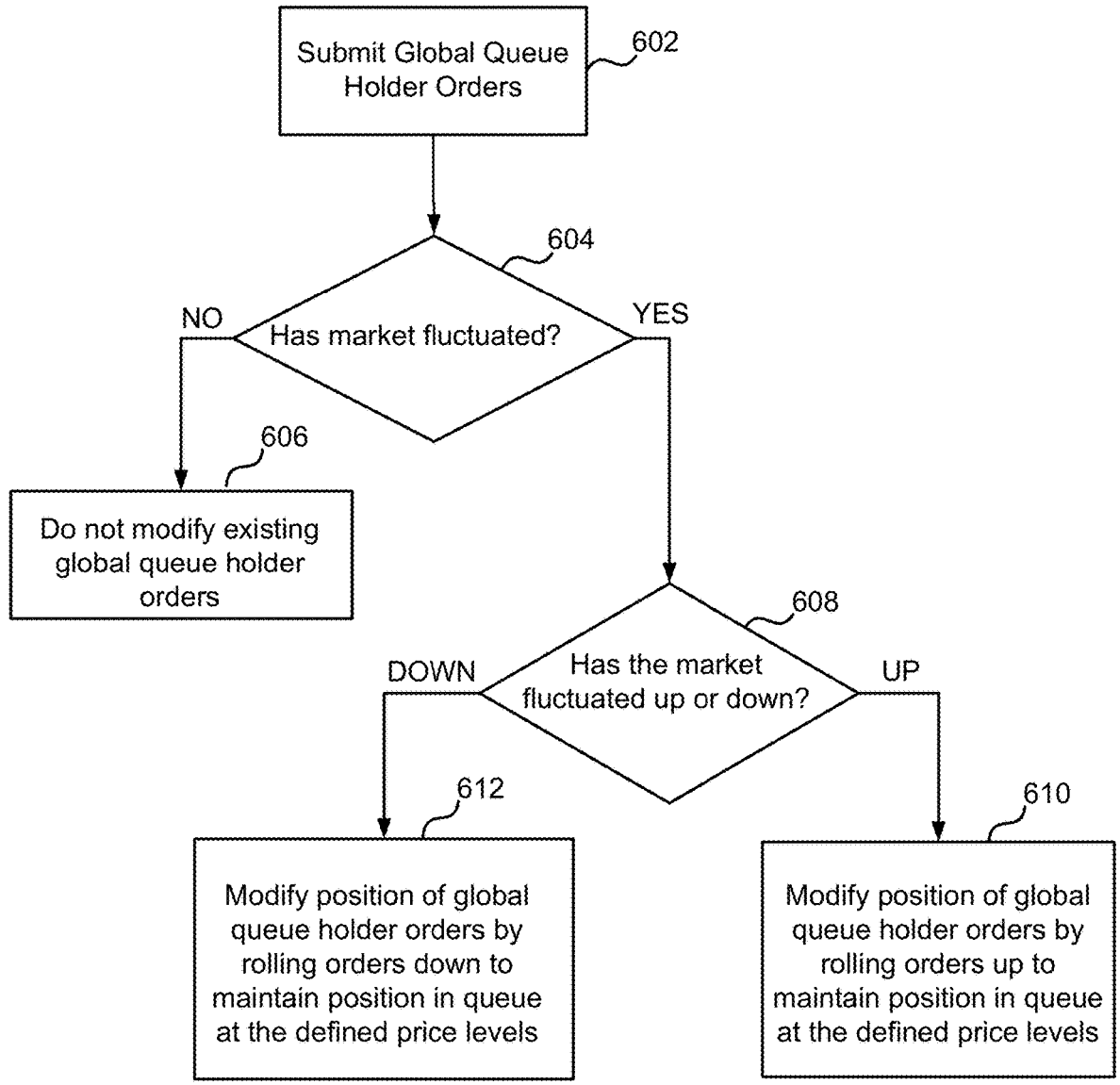
FIG. 6 is a flow chart illustrating an example method for modifying the order placement in an order queue in an electronic trading environment.

FIG. 6 is a flow chart illustrating an example method for modifying the position of an order in an order queue in an electronic trading environment. It should be understood that the flow chart only shows the functionality and operation of a possible implementation of the example method. In this regard, each block may represent a module, a segment, or a portion of the program code, which includes one or more executable instructions for implementing specific logical functions or steps in the process. Alternative implementations are included within the scope of the example embodiments of the present invention in which functions may be executed out of order from that shown or discussed, including substantially concurrent or in reverse order, depending on the functionality involved, as would be understood by those reasonably skilled in the art of the present invention.

As previously described, an advantage of global queue holder orders is that orders are entered into the market before they are actually needed, giving them the most advantageous position available in the order queue as possible. Quantity is held so that traders may assume ownership and gain a better queue position and an edge over other traders. When the market shifts and global queue holder orders need to be shifted, it is in the best interest of the traders that as few global queue holder orders as possible are moved such that order queue position may be maintained.

At step 602 the automated trading tool submits one or more global queue holder orders to the electronic exchange. The global queue holder orders are placed at the configured price levels and are associated with the configured quantity.

At step 604 the gateway determines if the market in the specified tradeable object has fluctuated.

At step 606 the gateway determines that the market in the specified tradeable object has not fluctuated. The gateway does not modify the price levels associated with the global queue holder orders.

At step 608 the gateway determines that the market in the specified tradeable object has not only fluctuated but whether or not the market fluctuated up or down. It is possible that when the market fluctuates, one or more of the global queue holder orders will no longer coincide with the defined order placement parameters.

At step 610 the gateway determines that the market in the specified tradeable object has fluctuated up one or more price levels. In this instance, the global queue holder orders on the buy and sell side may not coincide with the defined order placement parameters. When the market fluctuates up, the global queue holder orders must be rolled up to coincide with the correct price levels around the reference price level. Rolling the orders up means that the fewest number of orders are moved at a time in an attempt to maintain the most advantageous queue position as possible. Shifting all "6" orders would negate their advantageous queue position, as all would be removed from the queue and then placed at the end of another. In this example, the buy side order that is furthest from the reference point level would be rolled up to the price level closest to the reference price level. Similarly, the sell side order that is closest to the reference point level would be rolled up to the price level furthest from the reference price level. An example is provided with respect to FIG. 7.

At step 612, the gateway determines that the market in the specified tradeable object has fluctuated down one or more price levels. In this instance, the global queue holder orders on the buy and sell side may not coincide with the defined order placement parameters. When the market fluctuates down, the global queue holder orders must be rolled down to coincide with the correct price levels around the reference price level. Rolling the orders down means that the fewest number of orders are moved at a time in an attempt to maintain the most advantageous queue position as possible. Shifting all "6" orders would negate their advantageous queue position, as all would be removed from the queue and then placed at the end of another. In this example, the buy side order that is closest to the reference point level would be rolled down to the lowest price level coinciding with the order placement parameters. Similarly, the sell side order that is farthest from the reference point level would be rolled down to the price level closest to the reference price level.

Figure 7:
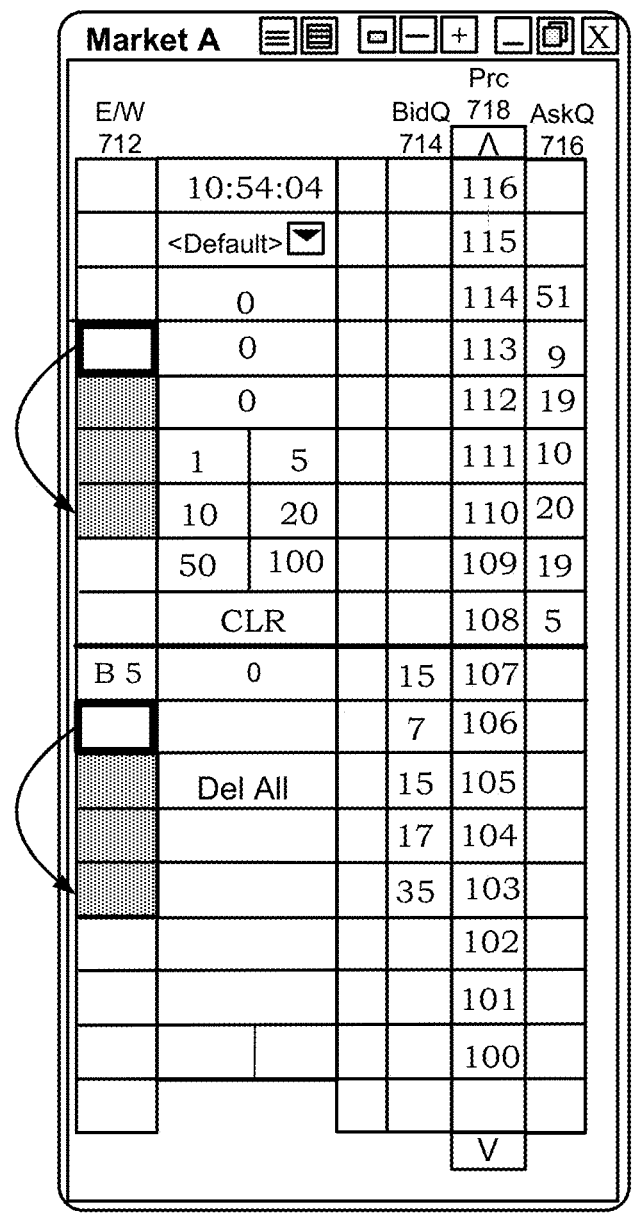
FIG. 7 is a block diagram illustrating an example method of moving global queue holder orders based on a market fluctuation in the tradeable object.

FIG. 7 is a block diagram illustrating an example method of modifying global queue holder orders based on the market in the tradeable object fluctuating down.

As shown in FIG. 7, the market data associated to tradeable object Market A has fluctuated down, such that the best bid has moved from "108" to a price level of "107" and the best ask from "109" to "108." As the market fluctuates, the automated trading tool must move the global queue holder orders to continually correspond to price levels defined in the order placement parameters. The order placement parameters, as discussed with reference to FIGS. 5A-B, defined that global queue holder orders should be centered around "2" price level outside the inside market. Therefore, when the market fluctuates, the global queue holder orders are no longer associated with the correct price levels.

Referring to FIG. 7, instead of moving all "3" queue holder sell orders shown in FIG. 7, the automated trading tool moves the order farthest from the reference price level down to the price level that is closest to the reference price level. Once the global queue holder sell order is moved, the orders are once again associated with the correct price levels surrounding the reference price level, "110", "111", and "112" respectively. Had the global queue holder order that was at a price level of "113" not been moved to "110", then the orders would have been "3" price levels away from the reference price level.

Similarly, referring to FIG. 7, instead of moving all "3" queue holder buy orders shown in FIG. 7, the automated trading tool moves the order closest to the reference price level down to the price level furthest from the reference price level. Once the global queue holder buy order is moved, the orders are associated with the correct price levels surrounding the reference price level, "103", "104", and "105" respectively. Had the global queue holder order that was at a price level of "106" not been moved to "103", then the orders would have been "1" price level away from the reference price level.

Figure 8:
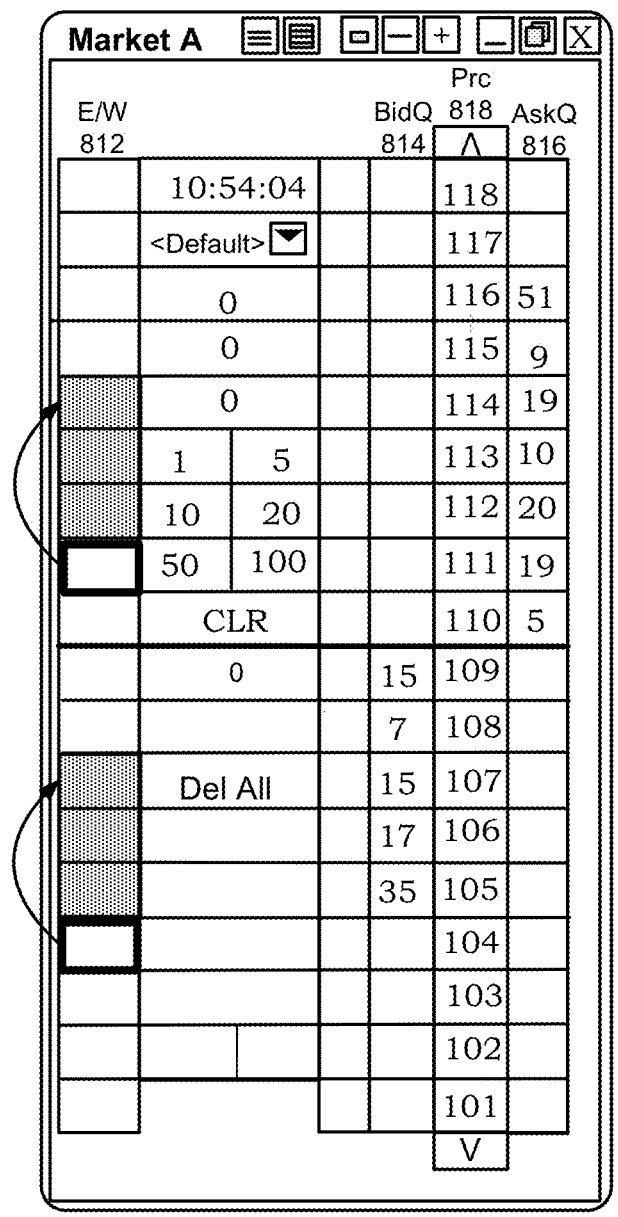
FIG. 8 is a block diagram illustrating an example method of moving global queue holder orders based on a market fluctuation in the tradeable object.

FIG. 8 is a block diagram illustrating an example method of modifying global queue holder orders based on the market in the tradeable object fluctuating up.

As shown in FIG. 8, the market data associated to tradeable object Market A has fluctuated up, such that the best bid has moved from "108" to a price level of "109" and the best ask from "109" to "110, as shown in FIGS. 5A-B. As the market fluctuates, the automated trading tool must move the global queue holder orders to continually correspond to price levels defined in the order placement parameters. The order placement parameters, as discussed with reference to FIGS. 5A-B, defined that global queue holder orders should be centered around "2" price level outside the inside market. Therefore, when the market fluctuates, the global queue holder orders are no longer associated with the correct price levels.

Referring to FIG. 8, instead of moving all "3" queue holder sell orders shown in FIG. 8, the automated trading tool moves the order closest to the reference price level up to the price level that is furthest from the reference price level. Once the global queue holder sell order is moved, the orders are once again associated with the correct price levels surrounding the reference price level, "112", "113", and "114" respectively. Had the global queue holder order that was at a price level of "111" not been moved to "114", then the orders would have been "1" price level away from the reference price level.

Similarly, referring to FIG. 8, instead of moving all "3" queue holder buy orders shown in FIG. 8, the automated trading tool moves the order farthest from the reference price level up to the price level closest to the reference price level. Once the global queue holder buy order is moved, the orders are associated with the correct price levels surrounding the reference price level, "105", "106", and "107" respectively. Had the global queue holder order that was at a price level of "104" not been moved to "107", then the orders would have been "3" price levels away from the reference price level.

Conclusion

The example embodiments discussed above describe a method for optimizing order placement in an order queue in an electronic trading environment. Specifically, the embodiments optimize order placement by, among other things, placing one or more global queue holder orders in a tradeable object to hold one or more positions in an order queue. Global queue holder orders may be configured to be placed around a reference price level, at multiple price levels, with constant or varying quantities, and at varying times during the trading day.

When using conventional automated trading tools, traders may only receive as advantageous of a queue position as they are quick to place an order. According to the present embodiments, traders may receive a better queue position when they place orders at prices levels in which global queue holder orders are already holding quantity to be transferred to their ownership. This method allows a trading administrator to reserve quantity for any trader within a trading firm or brokerage house to gain an important advantage over other traders participating in the market. Additionally, the trading administrator or the automated trading tool, can scale the amount of quantity being held based on the number of interested traders, market activity, trading volume, etc.

Traders may submit order request for quantity at price levels at which global queue holder orders are holding quantity. Traders may be aware of these prices levels as they may be indicated on the trading screen. Indication of where global queue holder orders have been places is configurable, but may consist of a shaded cell, bolded cell, etc. Regardless of whether or not the trader is aware of where quantity is being held, the gateway will track orders placed by the traders as well as global queue holder orders. When a trader submits an order for a quantity at a price level at which quantity is being held, the gateway will compare that order information to the global queue holder order information being stored in a database. If the trader's order coincides with a price level at which quantity is held, then the gateway will virtually transfer ownership of that quantity to the trader. If/when that order quantity matched at the electronic exchange, the fill information will be sent back to the gateway, at which time the gateway will then look to the database to see which trader actually owned the order quantity. The associated fill information will be forwarded to that trader.

The above description of the example embodiments, alternative embodiments, and specific examples, are given by way of illustration and should not be viewed as limiting. Further, many changes and modifications within the scope of the present embodiments may be made without departing from the spirit thereof, and the present invention includes such changes and modifications.

It will be apparent to those of ordinary skill in the art that methods involved in the system and method for reducing the risks involved in trading multiple spread trading strategies may be embodied in a computer program product that includes one or more computer readable media. For example, a computer readable medium can include a readable memory device, such as a hard drive device, CD-ROM, a DVD-ROM, or a computer diskette, having computer readable program code segments stored thereon. The computer readable medium can also include a communications or transmission medium, such as, a bus or a communication link, either optical, wired or wireless having program code segments carried thereon as digital or analog data signals.

The claims should not be read as limited to the described order or elements unless stated to that effect. Therefore, all embodiments that come within the scope and spirit of the following claims and equivalents thereto are claimed as the invention.

The invention claimed is:

1. A method including:
   sending by a gateway a plurality of orders for a tradeable object to an electronic exchange:
   wherein each of the plurality of orders is sent to a queue at the electronic exchange and specified by a price and a quantity,
   wherein each of the plurality of orders has a corresponding position in the queue at the electronic exchange, and
   wherein each of the plurality of orders is a global queue holder order associated with a trading group;
   storing by the gateway in a database an owner associated with each of the plurality of orders, wherein the owner associated with each of the plurality of orders is initially a default trader for the trading group;
   receiving by the gateway, after the plurality of orders have been sent to the electronic exchange, an order request message from a client device for a first trader, wherein the first trader is associated with the trading group and shares the plurality of orders, wherein the order request message includes a price, wherein the price of the order request message corresponds to the price of a first order of the plurality of orders associated with the trading group, wherein the owner associated with the first order is the default trader, wherein an order at the electronic exchange resulting from the order request message would be at a worse position in the queue than the corresponding position in the queue of the first order;
   updating by the gateway the database to transfer the owner associated with the first order from the default trader to the first trader; and
   dropping by the gateway the order request message once the database has been updated so that the order request message is not forwarded to the electronic exchange;
   detecting by the gateway a fill for one of the plurality of orders, wherein the owner associated with the filled order is the default trader; and
   submitting by the gateway an offsetting order to offset the quantity of the filled order, wherein the offsetting order is a market order.

2. The method of claim 1, wherein the plurality of orders are based on at least one order placement parameter.

3. The method of claim 2, wherein one of the at least one order placement parameters is a reference price, wherein the price of each of the plurality of orders is based on the reference price.

4. The method of claim 2, wherein one of the at least one order placement parameters is a number of price levels at which the plurality of orders are placed.

5. The method of claim 2, wherein one of the at least one order placement parameters is a number of global queue holder orders placed at each price level.

6. The method of claim 2, wherein one of the at least one order placement parameters is a quantity parameter, wherein the quantity of each of the plurality of global queue holder orders is based on the quantity parameter.

7. The method of claim 6, wherein the quantity parameter specifies that the quantity for each of the plurality of orders is variable depending on the proximity to a reference price.

8. The method of claim 6, wherein the quantity parameter specifies that the quantity for each of the plurality of orders is constant.

9. The method of claim 6, wherein the quantity parameter specifies that the quantity for each of the plurality of orders is based on historical trading information.

10. The method of claim 6, wherein the quantity parameter specifies that the quantity for each of the plurality of orders is dynamic.

11. The method of claim 2, wherein one of the at least one order placement parameters is a time of day when the plurality of orders are placed at the electronic exchange.

12. The method of claim 1, wherein the plurality of orders are limit orders.

13. The method of claim 1, further comprising:
submitting by the gateway an additional order at a price corresponding to the price of the first order once ownership has been transferred.

14. The method of claim 1, further comprising:
displaying by the gateway a graphical indicator representing the price at which one of the plurality of orders has been placed.

* * * * *